F. A. AND A. L. LOMAN AND H. C. DEAN.
ROD AND PIPE GRAB FOR WELLS.
APPLICATION FILED APR. 1, 1920.

1,421,266.

Patented June 27, 1922.
2 SHEETS—SHEET 1.

Inventors
Fray A. Loman
Allie L. Loman
Henry C. Dean,
By Warren D. House
Their Attorney.

Witness:
R. E. Hamilton

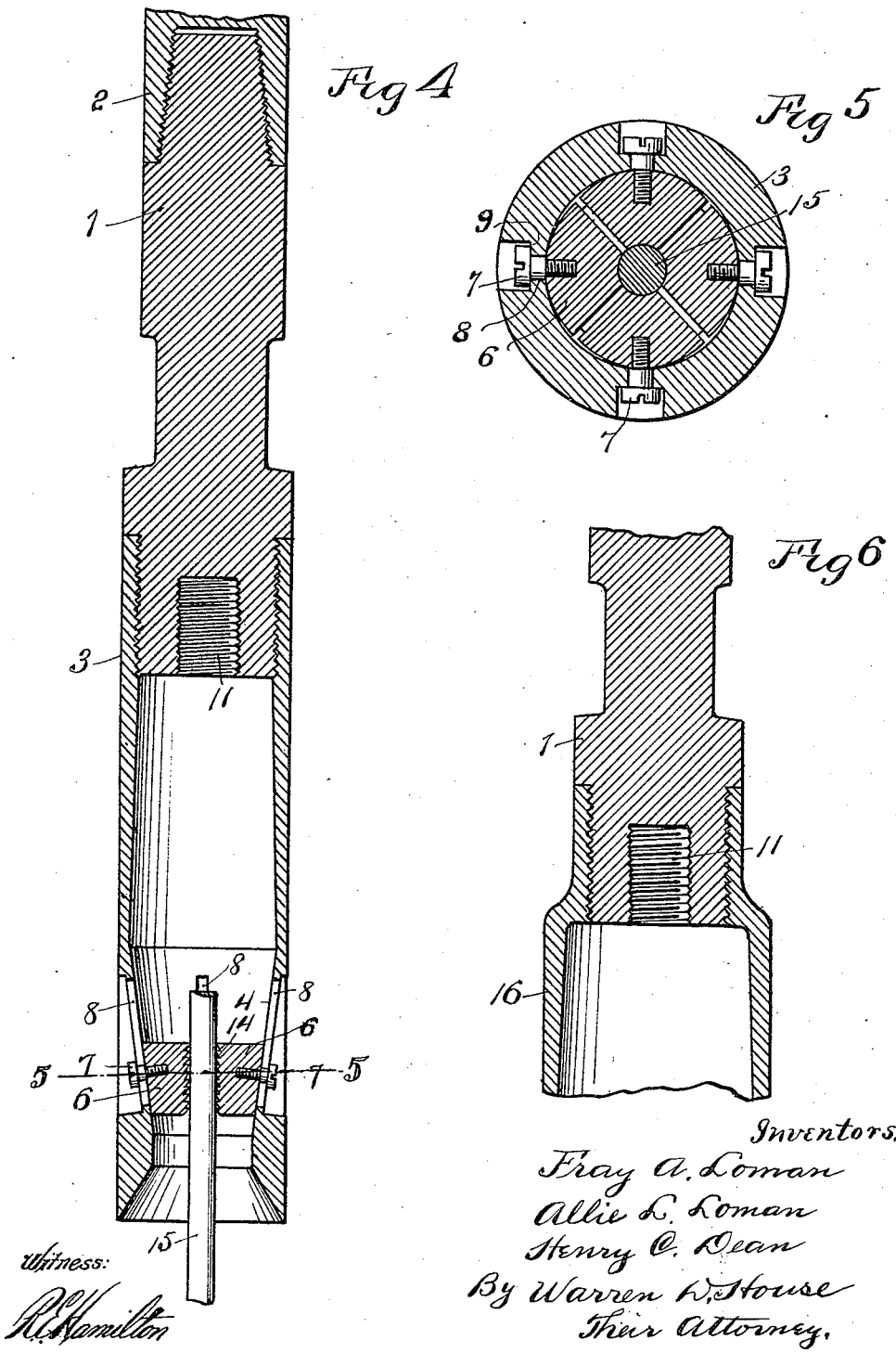

UNITED STATES PATENT OFFICE.

FRAY A. LOMAN, ALLIE L. LOMAN, AND HENRY C. DEAN, OF ELDORADO, KANSAS.

ROD AND PIPE GRAB FOR WELLS.

1,421,266.  Specification of Letters Patent.  Patented June 27, 1922.

Application filed April 1, 1920. Serial No. 370,558.

*To all whom it may concern:*

Be it known that we, FRAY A. LOMAN, ALLIE L. LOMAN, and HENRY C. DEAN, citizens of the United States, residing at Eldorado, in the county of Butler and State of Kansas, have invented a certain new and useful Improvement in Rod and Pipe Grabs for Wells, of which the following is a specification.

Our invention relates to improvements in rod or pipe grabs. Our invention is particularly well adapted for use in oil or gas wells for removing broken rods or pipes therefrom.

One of the objects of our invention is to provide a grab of the kind described which is simple in construction, cheap to make, durable, not liable to get out of order, and which is efficient in operation.

A further object of our invention is to provide a grab adapted for use in wells having casings of different diameters.

Still another object of our invention is to provide a grab adapted to engage and remove pipes or rods of different diameters.

A further novel feature of our invention is the provision of rod or pipe clamping members which are movable independently of each other to and from the clamping position and without the employment of springs.

The novel features of our invention are hereinafter fully described and claimed.

In the accompanying drawings which illustrate the preferred embodiment of our invention, Fig. 1 is a vertical sectional view of our improved rod or pipe grab, shown clampingly engaging a pipe.

Fig. 4 is a view similar to Fig. 1, showing the grab clampingly engaging a rod.

Fig. 5 is an enlarged cross section on the line 5—5 of Fig. 4.

Fig. 6 is a vertical sectional view of a portion of the larger bowl shown attached to the shank.

Similar reference characters designate similar parts in the different views.

Figure 1:
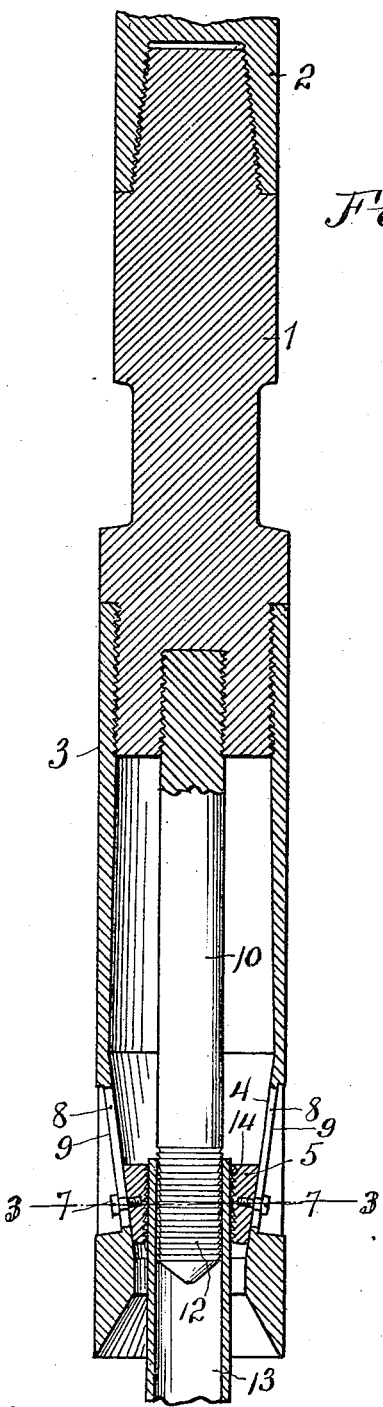
Figure 2:
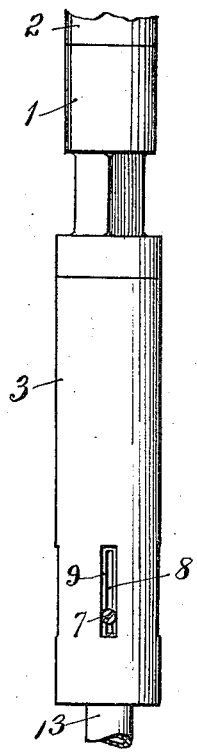
Fig. 2 is a reduced side elevation of the same.

1 designates the shank of the grab having a threaded upper end adapted for attachment to the connecting socket 2 of the usual mechanism employed for purposes of this kind.

The lower end of the shank 1 is screw threaded and has detachably fitted thereon the upper end of a vertical tubular member 3, ordinarily termed a "bowl," the lower inner portion of which is provided with a downwardly converging guide surface 4.

Two sets of rod or pipe clamping members 5 and 6 of different transverse thickness are adapted to be interchangeably slidably mounted upon the converging surface 4 against which surface, the clamping members 5 and 6 are reliably retained by means of suitable retaining means, preferably comprising shouldered screws 7, respectively mounted in the clamping members 5 and 6, and respectively extending through and slidable in vertical slots 8 provided in the sides of the bowl 3. The heads of the screws 7 slidably respectively engage exterior guiding surfaces 9 which are parallel with the converging surface 4.

The lower end of the bowl 3 is downwardly flaring on its inner side, so as to guide the rod or pipe between the clamping members 5 or 6 as the case may be.

10 designates a vertical mandrel disposed centrally in the bowl 3 between the clamping members 5 or 6, and having a screw threaded upper end adapted to be removably fitted in a central threaded hole 11 in the lower end of the shank 1.

The lower end of the mandrel 10 is conical, the point of the cone being, preferably, adjacent to the upper end of the flaring lower end of the bowl. By this construction, the mandrel will enter readily the upper jammed end of a pipe and spread it out to normal condition.

Figure 3:
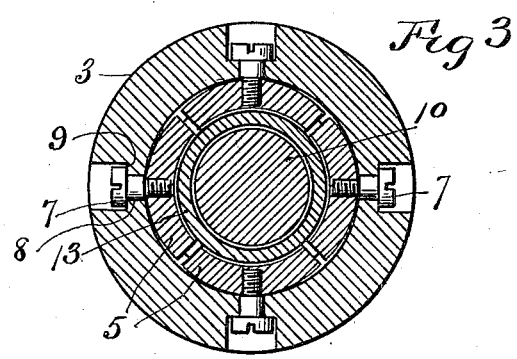
Fig. 3 is an enlarged cross section on the line 3—3 of Fig. 1.

The lower portion of the mandrel 10 is provided with a plurality of annular upwardly projecting teeth 12 adapted to grip the inner side of a pipe 13, Figs. 1 and 3.

The inner surfaces of the clamping members 5 and 6 are each provided with upwardly projecting teeth 14 adapted to grip the outer side of a pipe 13 or the outer side of a rod 15, Figs. 4 and 5.

When it is desired to remove tubing too large in diameter to enter the bowl 3, the latter is removed from the shank 1, and another bowl 16, Fig. 6 is mounted on the shank. The bowl 16 is of larger size, in diameter, than the bowl 3, but has an internally threaded end adapted to fit the shank 1. In other respects the bowl 16 corresponds in construction to the bowl 3, and is adapted to have slidably fitted therein the clamping members 5 or 6, or similar clamping members of different transverse thickness.

In the operation of my invention, when it is desired to remove a pipe, such as a pipe 13, the grab is lowered into the well until the upper end of the pipe to be removed enters the lower end of the bowl 3, Fig. 1, between the clamping members 5, the latter being forced upwardly by the pipe until they are separated sufficiently to permit the pipe to pass them, at which time the mandrel 10 has entered the pipe. The clamping members 5 will bear against the outer side of the pipe, so that when the shank 1 is drawn upwardly, by the hoisting mechanism employed for this purpose, the clamping members 5 will be forced downwardly by the inclined surface 4 so that they tightly grip the pipe and force it against the teeth 12 of the mandrel 10. The pipe will thus be tightly gripped and can be withdrawn.

In case that the upper end of the pipe 13 is slivered, and one of the slivers extends laterally outwardly, the clamping member 5 which is engaged by the sliver will be forced upwardly higher than the other clamping members until it clears the sliver, after which it will slide downwardly to a position in which it will engage the body of the pipe. The clamping members 5 and 6 being independently movable to and from the clamping position, slivered pipes may be readily engaged in the manner just above described. The clamping members move to the clamping position by gravity and the use of springs is obviated.

When it is desired to remove a rod, such as the rod 15, Figs. 4 and 5, the clamping members 6 are substituted for the thinner clamping members 5, the latter being removed. The grab is then lowered into the well until the upper end of the rod 15 enters the bowl 3 between the clamping members 6, the mandrel 10 having been previously removed. When the grab is drawn upwardly, the clamping members 6 will slide downwardly into tight gripping engagement with the rod 15, thus securely gripping the latter, so that it will be withdrawn with the grab.

In case that the rod to be withdrawn is of sufficiently small diameter to pass between the mandrel 10 and the inner wall of the contracted portion of the bowl 3, the mandrel 10 need not be removed nor the thicker members 6 substituted for the clamping members 5. In such case, the rod will pass upwardly between the bowl 3 and the mandrel 10 and will strike and lift one of the clamping members 5 until the latter has reached a position in which the rod will pass between it and the mandrel. If the grab is now drawn upwardly, the clamping member 5 which is engaged by the rod will clamp the rod tightly against the mandrel 10 and the rod may then be pulled up with the grab.

With the use of my invention, the clamping members being seated solely by gravity, the rod or pipe which is being extracted does not have to compress any springs and has only the weight of the clamping members to lift in passing to the clamping position.

We do not limit our invention to the structure shown and described, as many modifications, within the scope of the appended claims, may be made without departing from the spirit of our invention.

What we claim is:—

1. In a rod or pipe grab, a supporting shank, a bowl carried thereby having an inner downwardly converging guide surface, a plurality of rod or pipe clamping members slidably engaging said converging surface and movable independently of each other to and from the clamping position, and a mandrel carried by and in fixed relation to said shank in said bowl and extending between said clamping members and adapted to co-operate with the latter for clamping a rod or pipe.

2. In a rod or pipe grab, a supporting shank, a bowl carried thereby having an inner downwardly converging guide surface, a plurality of rod or pipe clamping members slidably engaging said surface and having means respectively for reliably retaining said members in slidable engagement with said surface, said clamping members being movable independently of each other to and from the clamping position, and a mandrel, carried by and in fixed relation to said shank and extending between said clamping members and arranged to co-operate therewith in clamping a rod or pipe.

3. In a rod or pipe grab, a supporting shank, a bowl carried thereby having an inner downwardly converging guide surface, a plurality of rod pipe clamping members slidably engaging said surface, and a mandrel detachably mounted on and in fixed relation to said shank in said bowl and when so mounted extending between said clamping members and arranged to co-operate therewith in clamping a rod or pipe.

4. In a rod or pipe grab, a supporting shank, a plurality of bowls having means for being interchangeably and detachably mounted on said shank, a mandrel mounted on and in fixed relation to said shank in said bowl, and rod or pipe clamping members arranged to be slidably mounted in either of said bowls and to co-operate with said mandrel to clamp a rod or pipe.

In testimony whereof we have signed our names to this specification.

FRAY A. LOMAN.
ALLIE L. LOMAN.
HENRY C. DEAN.